(12) United States Patent
Lempidakis et al.

(10) Patent No.: US 9,868,244 B2
(45) Date of Patent: Jan. 16, 2018

(54) CONCENTRIC CO-EXTRUSION DIE FOR EXTRUDING A MULTILAYER THERMOPLASTIC FILM

(75) Inventors: Emmanouil Lempidakis, Iraklion (GR); Ioannis Melas, Iraklion (GR); Minas Kalarakis, Iraklion (GR)

(73) Assignee: Plastika Kritis S.A. (GR)

( * ) Notice: Subject to any disclaimer, the term of this patent is extended or adjusted under 35 U.S.C. 154(b) by 619 days.

(21) Appl. No.: 14/233,863

(22) PCT Filed: Jul. 19, 2012

(86) PCT No.: PCT/EP2012/064140
§ 371 (c)(1),
(2), (4) Date: Jan. 20, 2014

(87) PCT Pub. No.: WO2013/011079
PCT Pub. Date: Jan. 24, 2013

(65) Prior Publication Data
US 2014/0159275 A1 Jun. 12, 2014

(30) Foreign Application Priority Data

Jul. 20, 2011 (GB) .................................. 1112475.7

(51) Int. Cl.
*B29C 47/26* (2006.01)
*B29C 47/70* (2006.01)
(Continued)

(52) U.S. Cl.
CPC ........ *B29C 47/268* (2013.01); *B29C 47/0026* (2013.01); *B29C 47/065* (2013.01);
(Continued)

(58) Field of Classification Search
CPC . B29C 47/0026; B29C 47/065; B29C 47/261; B29C 47/263; B29C 47/265;
(Continued)

(56) References Cited

U.S. PATENT DOCUMENTS 2,709,834 A 6/1955 Johnson
3,650,649 A 3/1972 Schippers
(Continued)

FOREIGN PATENT DOCUMENTS

CN 2483171 Y 3/2002
CN 201405498 Y 2/2010
(Continued)

OTHER PUBLICATIONS

Chinese Search Report for Application No. 201280035639.2 dated Jun. 3, 2015.
(Continued)

*Primary Examiner* — Yogendra Gupta
*Assistant Examiner* — Joseph Leyson
(74) *Attorney, Agent, or Firm* — Lerner, David, Littenberg, Krumholz & Mentlik, LLP

(57) ABSTRACT

A large concentric co-extrusion die (1) is described having a plurality of annular or conical die mandrel layers (201-205). Each layer is formed between a pair of adjacent annular or conical die mandrels (101-106) defining between them a flow path for molten thermoplastics material from an inlet to an annular extrusion outlet (110) through which a thermoplastics tubular extrusion is formed in use. Extrusion takes place through the multiple annular layer outlets (301-305) to form a multi-layered product. At least one layer (203) of the annular or conical die mandrels has a plurality of molten material inlets arranged around the external circumference of the co-extrusion die with each inlet being connected to a feed channel (403) which has plural bifurcations (403.1, 403.2, 403.3) providing $2^n$ subsidiary outlet feed channels (503) where n is the number of bifurcations. Each subsidiary outlet feed channel being connected to a corresponding helical outlet channel (703).

16 Claims, 13 Drawing Sheets

(51) Int. Cl.
*B29C 47/00* (2006.01)
*B29C 47/06* (2006.01)
*B29C 47/56* (2006.01)
*B29C 47/36* (2006.01)

(52) U.S. Cl.
CPC .......... *B29C 47/261* (2013.01); *B29C 47/263* (2013.01); *B29C 47/265* (2013.01); *B29C 47/364* (2013.01); *B29C 47/56* (2013.01); *B29C 47/70* (2013.01); *B29C 47/705* (2013.01)

(58) Field of Classification Search
CPC ..... B29C 47/268; B29C 47/364; B29C 47/56; B29C 47/70; B29C 47/705
See application file for complete search history.

(56) References Cited

U.S. PATENT DOCUMENTS

| | | | |
|---|---|---|---|
| 3,809,515 A | | 5/1974 | Farrell |
| 3,837,773 A | | 9/1974 | Raley |
| 3,966,377 A | | 6/1976 | Upmeier et al. |
| 4,019,843 A | | 4/1977 | Zimmermann |
| 4,182,603 A | | 1/1980 | Knittel |
| 4,298,325 A | | 11/1981 | Cole |
| 5,076,776 A | | 12/1991 | Yamada et al. |
| 5,538,411 A | | 7/1996 | Gates |
| 5,702,786 A | * | 12/1997 | Robichaud .......... B29C 47/0023 264/211 |
| 5,716,650 A | | 2/1998 | Mavridis |
| 5,738,881 A | * | 4/1998 | Sagar ................. B29C 47/0023 425/133.1 |
| 6,413,595 B1 | | 7/2002 | Schirmer |
| 6,702,563 B2 | | 3/2004 | Sensen et al. |
| 6,866,498 B2 | | 3/2005 | Sagar et al. |
| 7,381,042 B2 | | 6/2008 | Rubbelke |
| 7,811,073 B2 | | 10/2010 | Mahler et al. |
| 2002/0114858 A1 | | 8/2002 | Castillo |
| 2004/0022886 A1 | | 2/2004 | Sagar et al. |
| 2004/0070105 A1 | | 4/2004 | Rasmussen |
| 2006/0210663 A1 | | 9/2006 | Castillo |
| 2009/0206510 A1 | * | 8/2009 | Rasmussen ......... B29C 47/0021 264/177.16 |

FOREIGN PATENT DOCUMENTS

| | | |
|---|---|---|
| DE | 10210847 A1 | 9/2003 |
| EP | 0765731 A2 | 4/1997 |
| EP | 1116569 A2 | 7/2001 |
| EP | 1941986 A1 | 7/2008 |
| FR | 2306819 A1 | 11/1976 |
| GB | 1384979 A | 2/1975 |
| GB | 2185931 A | 8/1987 |
| JP | 05-237910 A | 9/1993 |
| JP | 06-305003 A | 11/1994 |
| JP | 09-164577 A | 6/1997 |
| JP | 10166424 | 6/1998 |
| JP | 2001330179 A | 11/2001 |
| JP | 2011005824 A | 1/2011 |
| JP | 2011104807 A | 6/2011 |
| WO | 8900910 A1 | 2/1989 |
| WO | 9404341 A1 | 3/1994 |
| WO | 9737830 A2 | 10/1997 |
| WO | 0178966 A1 | 10/2001 |
| WO | 0911880 A2 | 1/2009 |

OTHER PUBLICATIONS

Wortberg J: "Neue Wendelverteilerwerkzeuge. New Spiral Mandrel Dies", Kunstoffe International, Carl Hanser Verlag, Munchen, DE, vol. 88, No. 2, Feb. 1, 1998, XP000732884.
International Search Report for Application No. PCT/EP2012/064140 dated Oct. 31, 2012.
International Written Opinion for Application No. PCT/EP2012/064140 dated Oct. 31, 2012.

* cited by examiner

US 9,868,244 B2

CONCENTRIC CO-EXTRUSION DIE FOR EXTRUDING A MULTILAYER THERMOPLASTIC FILM

CROSS-REFERENCE TO RELATED APPLICATIONS

The present application is a national phase entry under 35 U.S.C. §371 of International Application No. PCT/EP2012/ 0064140, filed Jul. 19, 2012 and published on Jan. 24, 2013 as WO 2013/011079, which claims priority from United Kingdom Patent Application No. 1112475.7, filed Jul. 20, 2011, the disclosures of which are incorporated herein by reference in their entirety.

The present invention relates to extrusion dies and, more particularly, to co-extrusion dies and especially those for extruding large width blown films using thermoplastic materials.

BACKGROUND

The basic function of any blown film extrusion die is to take one or more melt streams entering the die and distribute them to a single concentric annular melt stream at the die exit as uniformly as possible.

A number of different types of extruder die are known in the art. Concentric helical mandrel dies are cylindrical in shape and are mounted one above another secured to a common component to maintain their relative positions. Variations of this design may have, for example, a central feed where all melt streams are fed to the centre and then split to the helical outlet channels with radially arranged tubular ports. An example of this type is shown in U.S. Pat. No. 3,966,377. Another variation is an annular feed mandrel die in which the melt streams flow into the die through centrally located concentric annuli and then, through outwardly radially extending tubular ports, to helical outlet channels. This variation can be implemented in two subvariations; one with central part of the feed block is open for IBC tube installation, the other having the inner layer stream as the central pipe of the feed block. Examples are to be found in U.S. Pat. No. 4,182,603. A further variation is a side-feed mandrel die in which each layer has a single melt inlet on the outside of the die and the melt is then distributed in a pair of vertical paths to the entries of the helical outlet channels, each of the two distribution paths being on the same cylindrical surface as the corresponding helices. An example is to be found in U.S. Pat. No. 7,811,073.

Conical stacked mandrels stack one over another, with a variation of this design consisting of conical shaped mandrels stacked over one another outside and/or inside a vertical common path. Several options also exist as to the feeding of the helical entries of these dies, e.g. central feeding of all layers or side feeding of the layers with horizontal split feed at different heights. Examples are to be found in U.S. Pat. No. 6,702,563

Modular plate mandrels are split two-part modules which, like some conical designs, stack one on another. There are basically two options; out-in versions in which the melt streams flow from outside to inside, and in-out versions in which the melt streams flow from inside to outside of each module. A combination of the two types is also possible. The melt distribution is typically horizontally split but it can also combine some vertical paths to reduce diameter.

It is also possible to combine the types, for example the basic die being of concentric mandrel type with some layers being of modular plate design, usually for the outer layers of the multi-layer blown film.

WO01/78966 discloses a co-extrusion die with one of the extruded components being fed through a single side inlet into a bifurcated feed channel which supplies the die outlet and similar constructions are shown in WO90/11880 and JP2011005824.

US2004/022886 discloses a single layer extrusion die with side inlets feeding multiple bifurcated feed channels.

FIG. 1 attached shows a five-layer concentric mandrel die 1 with central feeding in accordance with prior art. The die shown in FIG. 1 has an 1800 mm diameter, i.e. for the annular path 110 to which all layers flow after they merge. This diameter also corresponds to the diameter of the mandrels of the middle layer of the die. Since the die is of centre-fed type, all the extruder inlets 401-405 (only two of which—401 and 405 are shown for simplicity) through which the molten thermoplastic is fed to the die are placed close to the bottom of the die and are spread around the perimeter. As can be seen, such dies have complex internal constructions, requiring the accurate registration of components in the different layers.

To avoid complexity in the figures only the main elements of parts of the flow paths are shown, but in detail each flow path includes:
- a horizontal inlet part 401-405, which extends to the centre of the die for the outer layer and towards the centre of the main die body 10, but to an off-center point for the remaining layers.
- a path 501-505 directed upwards and making any necessary bends in order to avoid collision with other layers and reach the centre (only path 501 is shown—for simplicity).
- multiple inclined radial ports 601-605 (which may also be horizontal and only port 601 is shown). Each of the inclined ports also has an additional vertical path as soon as it arrives at the layer mandrel (the one indicated in the drawing is small but still exists).

The length of each of the flow paths for the layers 201-205 from the die inlet to helical outlet channel start point is, for the layers in turn from inner layer to outer layer, 2772 mm, 2776 mm, 2803 mm, 2834 mm and 2893 mm.

Blown film dies exist from sizes of 50 mm to 2500 mm diameter. Most of the dies that are used for packaging film applications are of a maximum diameter of 900-1000 mm and up to eleven layers. These dies are of either concentric mandrel, modular or conical, or mixed. Conical stacked mandrel and modular plate designs can be implemented up to a diameter size of 900 mm, flared from 600-700 mm. There exist dies of modular plate design which are flared to 1300 mm from 600-700 mm and which have very long flaring melt flow paths.

Larger dies (up to 2500 mm) are typically of three to five layers and are usually central or annular mandrel dies, typically used for agricultural applications (e.g. greenhouse films) where large film dimensions are necessary (e.g. 8 to 22 m bubble circumference, 100-200 µm thickness), or for geomembrane applications (6 to 8 m bubble circumference, 500-2500 µm thickness)

In existing concentric dies of side feed design, the material follows a binary split distribution feed channel arrangement from a single side inlet of the layer to the starting point of each extrusion helical outlet. As the die gets bigger in diameter, the length of this flow channel gets longer and longer. As a consequence, higher melt pressures are developed in use and the material residence time gets longer, resulting in increased melt temperatures and material degradation. As a result side feed concentric mandrel dies have been limited to about 1200 mm die diameter.

In a typical large blown film die having 3 to 5 layers and 1800 mm die diameter all layers are centrally fed. For the middle layer of the die, this results an overall length between the die inlet to the helical outlet of more than 2700 mm (see above reference to FIG. 1).

As a consequence the average residence time as well as the tail of the residence time distribution become very long. In addition the size of the die does not allow reducing the thickness of a specific layer while maintaining good thickness uniformity of this layer due to the very long paths that the melt has to flow though within the die and the required low material quantity for such layer. Further, the back pressure developed between the layer inlet and the start of the helical outlet becomes very high, reducing the remaining available pressure which can be used for the helical outlet section of the layer to improve thickness uniformity due to the fact that total available pressure is limited.

Residence time and melt distribution around the die circumference is also a very critical issue for large dies, especially for sensitive materials because of carbon build up, high purging time, waste, deposits, etc. (slow moving particles are prone to degradation and long purging time).

An example is a 2 m diameter, five layer concentric mandrel die where the middle layer is designed to extrude an ethylene vinyl alcohol copolymer (EVOH) film at a very low output and percentage (e.g. less than 4%) and at a very good thickness tolerance distribution around the die circumference.

Such materials need to be processed with a very short residence time and also need to be used in very low percentages due to their significantly higher cost in relation to standard materials. As an example, EVOH has a cost which is in the range of 5-6 times higher compared to Polyolefins, therefore in case of a film combining both materials, EVOH has to be used in small percentages in order for the film to be of reasonable cost while maintaining the advantage that using EVOH has as to the barrier properties it provides.

Thus, it is often desirable to reduce residence time distribution, to minimize wetted surface area (the area where the polymer comes to contact with the metal), to minimize the melt volume inside the die, to optimise back pressure, to avoiding overheating the die, to enable rapid purging for efficient product change-over and reduction of resin waste, to eliminate flow lines in the final products, to eliminate melt fracture, interfacial instability, gels, black spots, carbon built up, etc., to improve operational flexibility in resin selection and processing parameters, to increase output levels and/or efficiency, to improve thickness tolerance of each layer and total film thickness, to improve film optics, and to achieve thermal isolation between layers especially the ones with significantly different processing temperatures.

The present invention targets, in particular, large co-extrusion blown film dies (with mandrel diameter above 1200 mm) for producing film bubbles of large circumference (8 to 22 m).

SUMMARY OF THE INVENTION

According to the present invention there is provided a concentric co-extrusion die having a plurality of annular or conical die mandrel layers, each layer comprising a pair of adjacent annular or conical die mandrels defining between them a flow path for molten thermoplastics material from an inlet to an annular extrusion outlet through which a thermoplastics tubular extrusion is formed in use, extrusion through the multiple annular or conical layer outlets forming a multi-layered product, characterised in that at least one layer of the annular or conical die mandrels has a plurality of molten material inlets arranged around the external circumference of the co-extrusion die, each inlet being connected to a feed channel which has plural bifurcations providing $2^n$ subsidiary outlet feed channels where n is the number of bifurcations, and each subsidiary outlet feed channel being connected to a corresponding helical outlet channel.

Such a construction is especially suited to dies having an annular film output of diameter above 1200 mm.

The molten material inlets arranged around the external circumference of the co-extrusion die may be connected to the corresponding feed channels via respective inlet paths passing through a main body of the die separate from the mandrels.

Alternatively, the molten material inlets arranged around the external circumference of the co-extrusion die may be connected to the corresponding feed channels via respective inlet paths passing through a central die block separate from both the mandrels and from a main body of the die.

The present invention can be implemented for a concentric mandrel die or conical central fed die or a combination of these.

It has been found that this significantly shortens the flow path length between the layer inlet and the start of the helical outlet channel compared to the corresponding flow path length for the same layer of the same size in a conventionally centrally fed concentric mandrel die as well significantly shortens residence time in the die. In addition pressure drop is minimised between the layer inlet and the start of the helical outlet channels compared to the pressure drop across the corresponding section of the same layer of a same size centrally fed concentric mandrel die. The reduction in pressure allows the gain in pressure to be used or partially used in the helical section of the layer to improve thickness uniformity. This results in better controlling of the uniformity of thickness of this layer by optimising the distribution of the melt flow around the circumference of the die.

In addition, although the presence of multiple side entry inlets may complicate the construction of the die as the side inlets have to pass through multiple other layers of the die, avoiding interference with channels in the other layers, and hence is counter-intuitive, due to the peripheral feed of the material and the shorter flow paths the melt is distributed around the circumference in an optimal way resulting in uniform thickness distribution even at very low percentages and outputs of the respective layer(s).

These factors are particularly important when using certain thermoplastic materials such as EVOH, Polyamide, PVDC and fluoropolymers as explained above, and particularly in a composite, multi-layer film where obtaining the right matching conditions between the films is also important.

In a die of the invention, the total number of layers of the die can be from two to twenty one and the number of side feed layers from one to eleven correspondingly. The side fed layers can have a plurality of molten material inlets with bifurcated feed channels disposed over a part or all of their length in one or more of a vertical, horizontal or conical orientation according to the type of mandrel used. The remaining layers can have central or annular feeding.

The number of inlets of the said layers may be between 2 to 16.

These types of dies can be installed in either a blow up configuration or in a blow down configuration.

It is also possible to have different materials for each of the extruders supplying the mandrel, resulting in different properties around the circumference of the film and resulting bubble.

Another possibility is to improve the thickness tolerance by controlling separately the throughput of each extruder supplying said mandrel, and in this way to correct thickness deviations around the bubble circumference. This can be done with or without melt pumps and can be connected with a thickness measurement unit for on-line thickness control.

The invention includes a method of extruding a multi-layer thermoplastic film using a co-extrusion concentric die as defined above. Material of particular interest which can be extruded through the at least one layer according to this method may be comprised of a polyamide or ethylene vinyl alcohol copolymer (EVOH) or PVDC or fluoropolymers. Additional materials of particular interest for this method are Thermoplastic Polyurethanes (TPU) or Polybutene-1 (PB-1).

BRIEF DESCRIPTION OF THE DRAWINGS

Examples of multi-layer concentric annular dies according to the prior art and the invention are shown in the accompanying drawings, in which.

DETAILED DESCRIPTION OF EXAMPLES IN ACCORDANCE WITH THE INVENTION

In the examples described below, the mandrel exit diameter is shown to be 1800 mm. However co-extrusion dies according to the present invention can have any desired exit diameter, but are especially suitable for diameters in the range of 1300 to 2500 mm. The detailed design of all parts depends on the final application as well as required residence time, pressure and other rheological parameters.

In the detailed description that follows, all the data of the dies mentioned (dimensions, number of extruders, total number of layers, number of layers which are side fed with multiple inlets, number of inlets per layer, number of bifurcations, number of spirals overlaps, number of spirals, number of radial ports, inclination of ports, inclination of side feed inlets etc) are indicative and only for the purpose of the examples.

Figure 4:
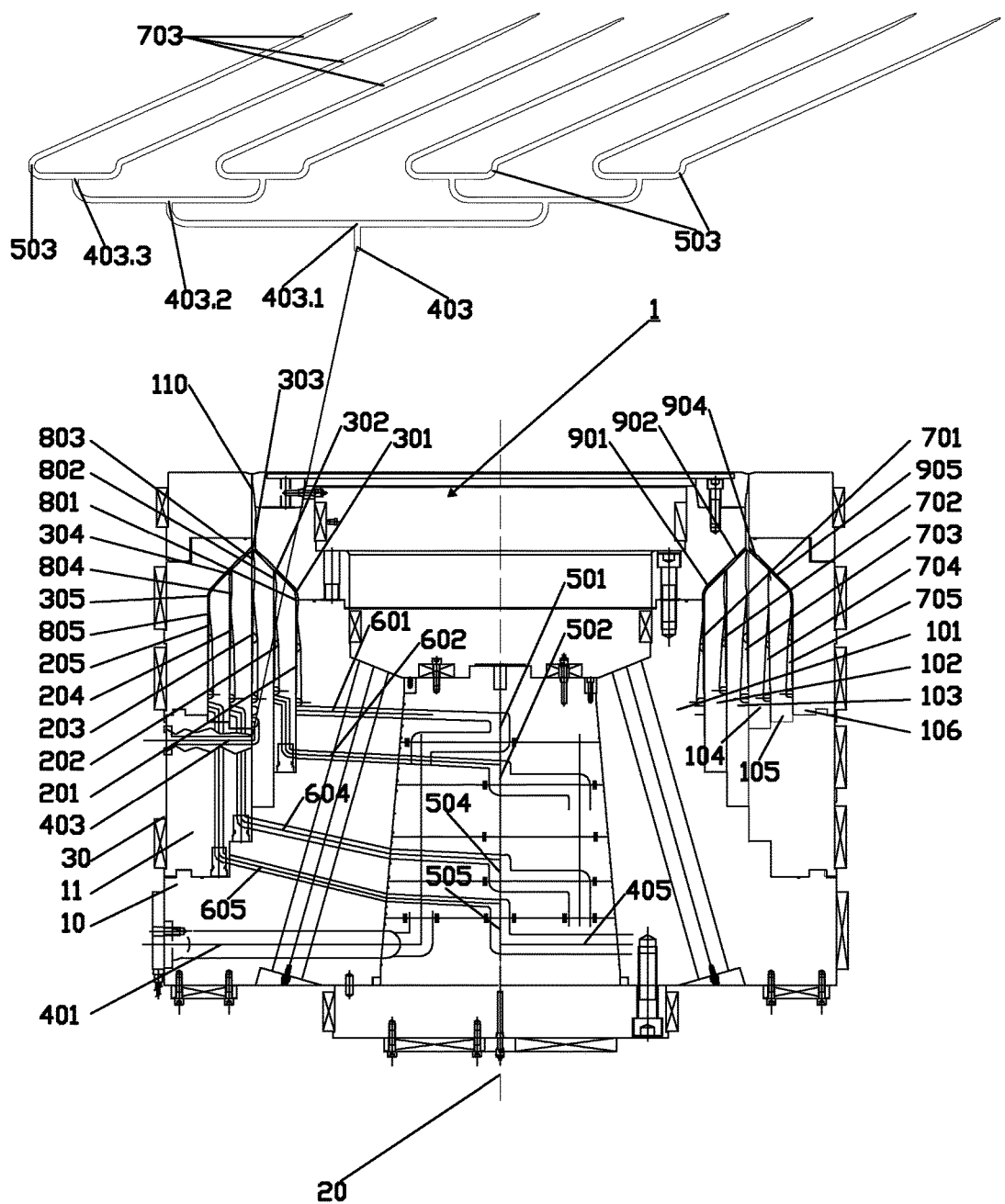
FIG. 4 has a main view which is a longitudinal section of a first example of a five-layer concentric annular co-extrusion die with the melt flow path of the middle extrusion outlet layer ($3^{rd}$ layer), and a secondary view showing a developed partial annular section through the middle layer, in accordance with the invention.

In FIG. 4, a longitudinal section of a first concentric co-extrusion die is shown as well as a developed partial annular section of the middle layer. The co-extrusion die 1 has six concentric mandrels 101-106 which define between them five annular extrusion layers 201-205, the outlets 301-305 of which feed an annular exit 110. The die mandrels 102,103 are supported on a main die body 10, part of which forms the die mandrel 101, whereas the die mandrels 104, 105,106 are supported on a central die block 11 as described in more detail below.

The layers 201,202,204 & 205 have conventional feed channel arrangements in which the melt of each layer follows a generally horizontal inlet path, 401,402,404,405 respectively through the main die body 10 (note that because of the position of the section the inlet paths 402 & 404 are not shown in FIG. 4) towards the central axis 20 of the die and each of which paths is then directed upwardly (as shown) along feed channels 501,502,504,505 (making any necessary bends in order to avoid collision with the melt stream flow paths of other layers). At the end of the feed channels where the respective feed channel arrives at the centre of the die, it splits into a number of radial channels, 601,602,604,605 respectively, typically 16 for each layer, directed from the centre to the periphery of the main die body 10. Only one of these radial channels for each layer is shown in FIG. 4.

The outlets of the radial channels are evenly distributed around the main die body leading into the respective outer circumference of the respective mandrel.

The radial channels 601 and 602 extend to the respective mandrel of the corresponding layer, where they are further split into two (not shown), and each such split feeds a single helical outlet channel 701,702 respectively, of the layer, so that each radial channel supplies two helical outlets. The helical outlets feed respective annular channels 801,802 which in turn feed inclined conical outlet channels 901,902 which extend to the annular die exit 110 as shown, where, in operation, all the individual layers of the film are brought together in the final annular extrusion. The channels 604,605 on the other hand take a slightly different form as they extend to a central die block 11, at which point they turn so as to lie generally parallel to the die axis 20 before entering into the corresponding die layers 204, 205. In other respects their paths are similar to the radial channels 601,602. At the respective mandrel of the corresponding layer, they are further split into two (not shown), and each such split feeds a single helical outlet channel 704,705 respectively, of the layer, so that each radial channel supplies two helical outlets. In an alternative form, the channels 604,605 may be split within the central die block 11, with or without further splits occurring within the mandrels. The helical outlets feed respective annular channels 804,805 which in turn feed inclined conical outlet channels 904,905 which extend to the annular die exit 110 as shown, where, in operation, all the individual layers of the film are brought together in the final annular extrusion.

Figure 1:
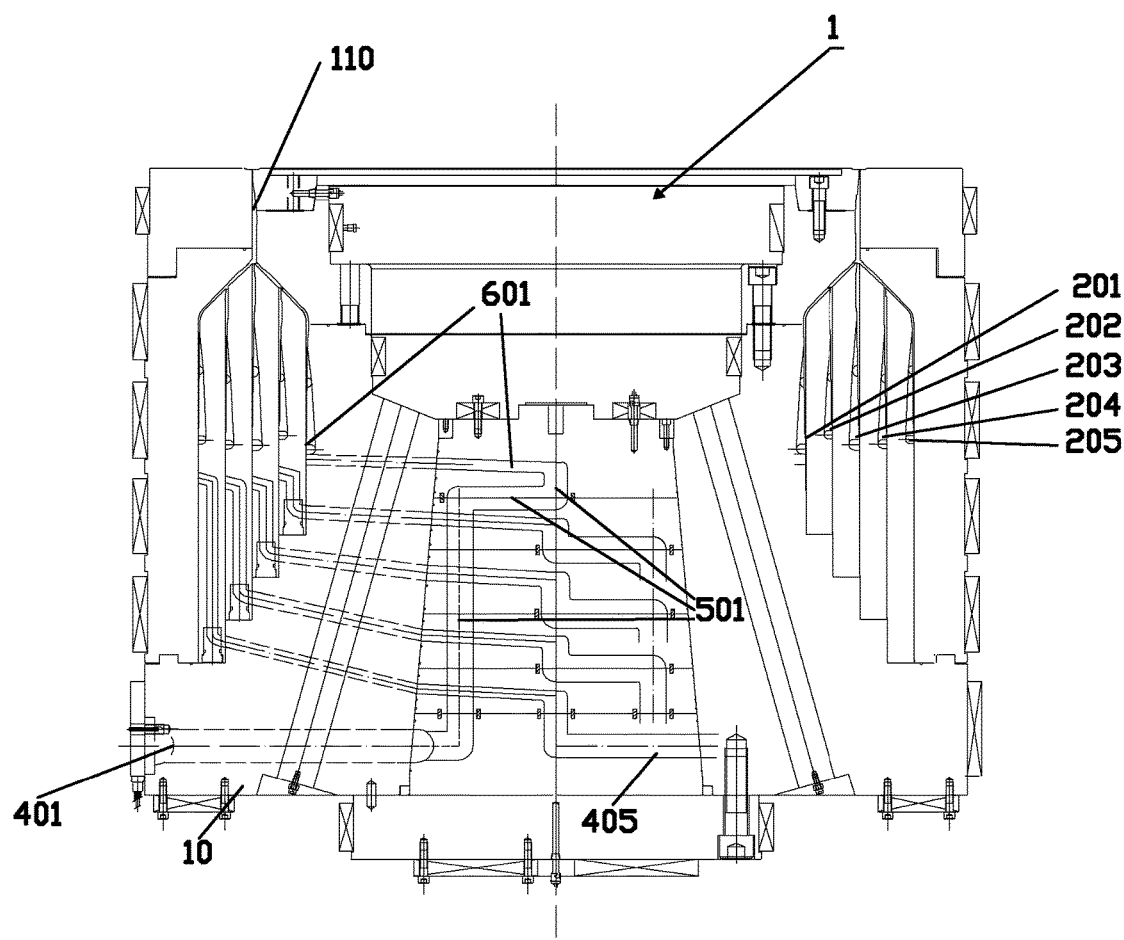
FIG. 1 (Prior art) is a longitudinal section of a prior art design of a five-layer concentric annular extrusion die.

However, layer 203 is fed, in accordance with the present invention, from the side, as indicated in the FIG. 4, through four horizontal inlet feed channels 403 (only one of which is shown in the section of FIG. 4), extending directly from the external circumference 30 of the die through a central die block 11 until it reaches the outer annular surface of mandrel 103 corresponding to the third or middle layer 203. After reaching the surface of mandrel 103, each feed channel 403 is bifurcated three times (as shown in the developed section of FIG. 4 at 403.1, 403.2, & 403.3) so that, ultimately, each feed channel 403 feeds eight subsidiary feed channels 503, each of which in turn feeds a respective helical outlet 703 of the layer 203, there thus being 32 in total for the layer 203. The central die block 11 which is formed as a single annular component, interfaces with the lower annular surfaces of the mandrels 104,105,106 to support them and also with the external circumferential surface of the mandrel 103 and provides a route for the feed channels 403 which avoids the need for complex sealing and/or registration between the mandrels 104,105,106 were the feed channels to have to pass directly through each of those mandrel layers. The central die block 11 thus also effectively shortens the die mandrels 104-106, The bifurcated distribution of a single one of the four feed channels 403 is indicated in the developed partial annular section of FIG. 4. In table 2 below, the length between the inlets of the middle layer to the die and the entry 403.3 of the last bifurcation before the inlet of the corresponding helical outlets has been calculated. For the middle or third layer and it is 940 mm. This example can be compared to the prior art die of FIG. 1 where the length of the flow path of the same middle layer of the same diameter die is calculated as 2803 mm. As one can see, with the length of feeding path of the central layer of the die fed according to prior art being 2803 mm as indicated in table 1, while the length of the same path according to the present invention is 940 mm (as indicated in table 2 below), there is a 66.4% reduction in overall length. Given that the path length has very important impact on residence time and back pressure, such a reduction will also reduce the residence time and back pressure, thus enabling the use of heat sensitive materials in dies (especially larger ones).

In addition, having less pressure drop in the distribution section of the flow path enables more pressure to be available to be consumed (totally or in part) in the helical outlet channels 701-705. This improves thickness uniformity. If the pressure margin is only partially consumed at the helical outlets or if it is not consumed at all, reduced backpressure at the die inlet results, which is also an advantage, since reduced pressure also results in a reduction of the melt temperature.

TABLE 1

Layer length calculation of a prior art 5 layer centrally fed co extrusion die

| Layer | Diameter | Total length |
|---|---|---|
| A (inner) | 1480 | 2772 |
| B | 1640 | 2776 |
| C(middle) | 1800 | 2803 |
| D | 1960 | 2834 |
| E (outer) | 2120 | 2893 |

Figure 5:
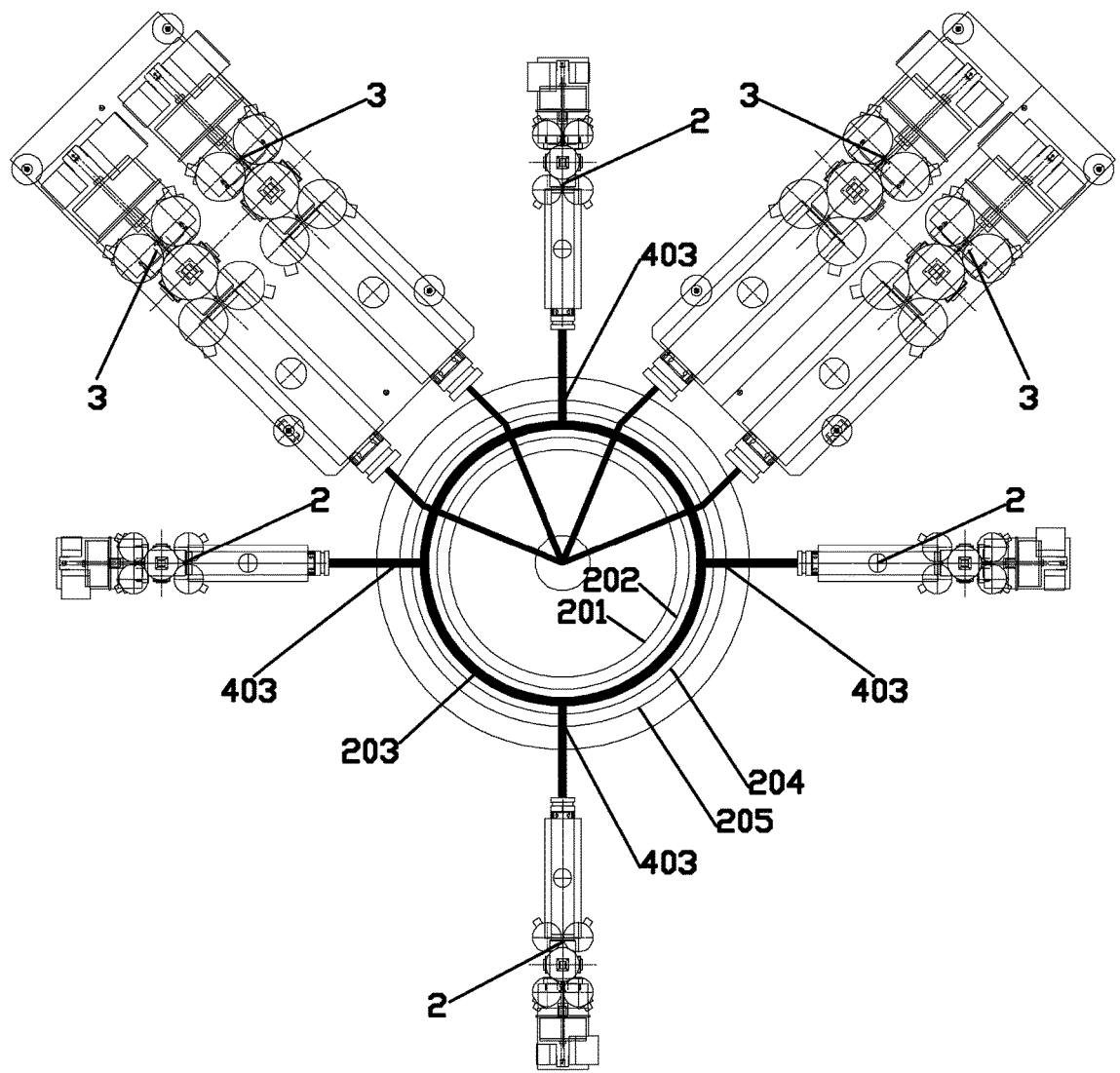
FIG. 5 shows, plan view, an arrangement of extruders around the co-extrusion die of FIG. 4.

FIG. 5 shows a top view of the concentric die extruder of FIG. 4 for a five layer blown film line. In this embodiment, the middle layer 203 of the five layer line extrusion die 1 has side feed from four small extruders 2, while the remaining layers 201,202,204,205 are each centrally fed each by a single larger extruder, 3.

While four extruders, one corresponding to each inlet channel 403 are shown in FIGS. 4 and 5, other numbers of extruders could be used in order to feed the central or third layer 203 of the extruder. For example, two or three extruders can be used with a corresponding number of inlet feed channels 403.

In addition, any layer could be side-fed supplied with any desired number of extruders, while also more than one layer (two, three etc) could be side fed simultaneously in accordance with the present invention. Further, the extrusion die can have any number of layers equal to or more than two and any diameter, especially above 1300 mm.

In other embodiments one extruder can feed more than one said layer from each side of the die.

Figure 6:
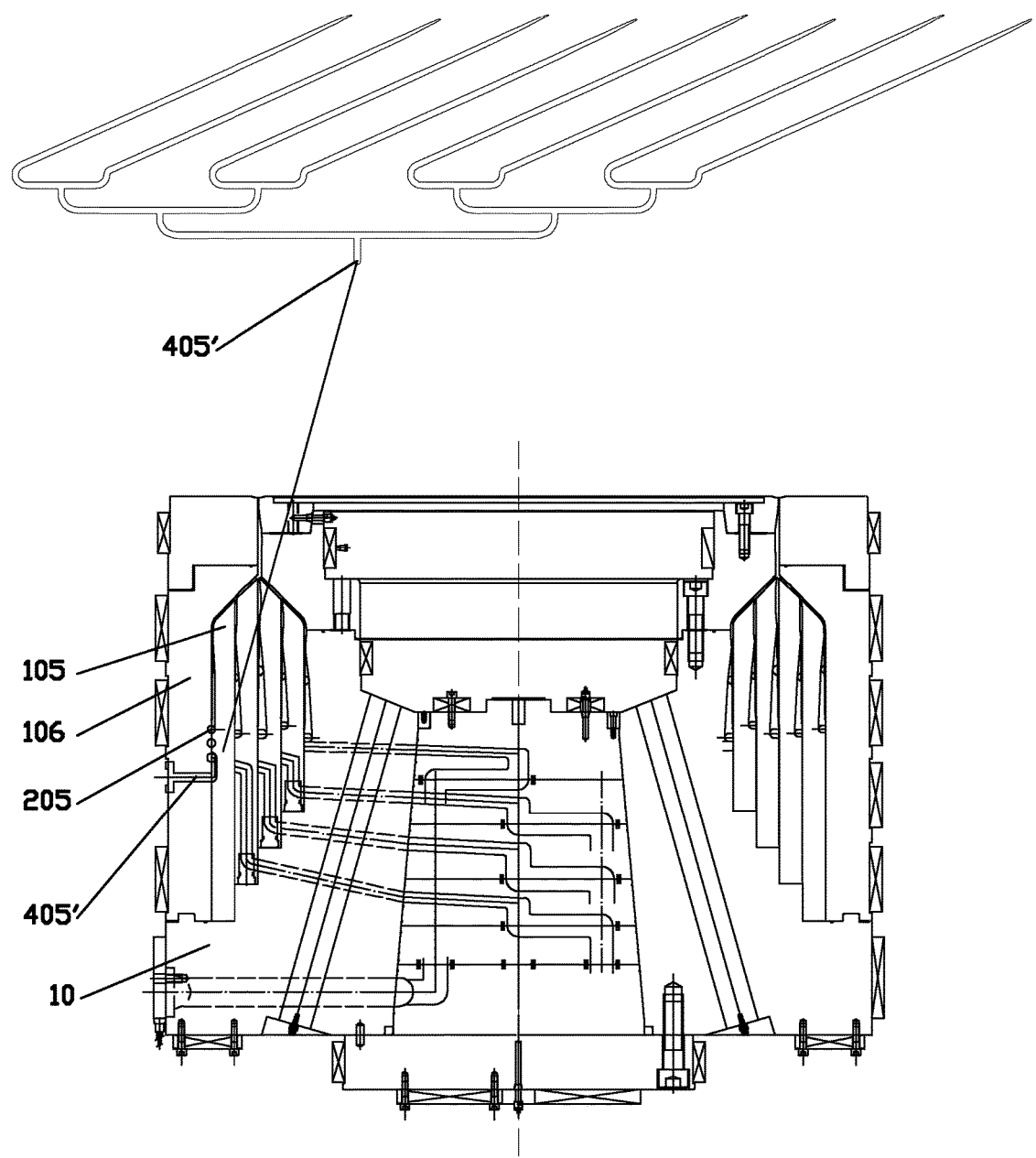
FIG. 6 is similar to FIG. 4, but showing another co-extrusion die with the melt flow path of the $5^{th}$, outer, layer and developed, in accordance with the invention.

In a further embodiment according to the present invention shown in FIG. 6, outer layer 205 is side fed through feed channel 405' which passes through the mandrel 106. In this case, referring to table 2 below, the flow path length is 874 mm. The length of flow path for the same layer of a die according to the prior art is 2893 mm as shown in the above table 1, therefore providing a 69.7% reduction in length according to this example of the invention.

TABLE 2

Layer length calculations for a 5 layer co-extrusion die of the example

| Layer | Diameter | Total length |
|---|---|---|
| C(middle) | 1800 | 940 |
| E (outer) | 2120 | 874 |

Figure 7:
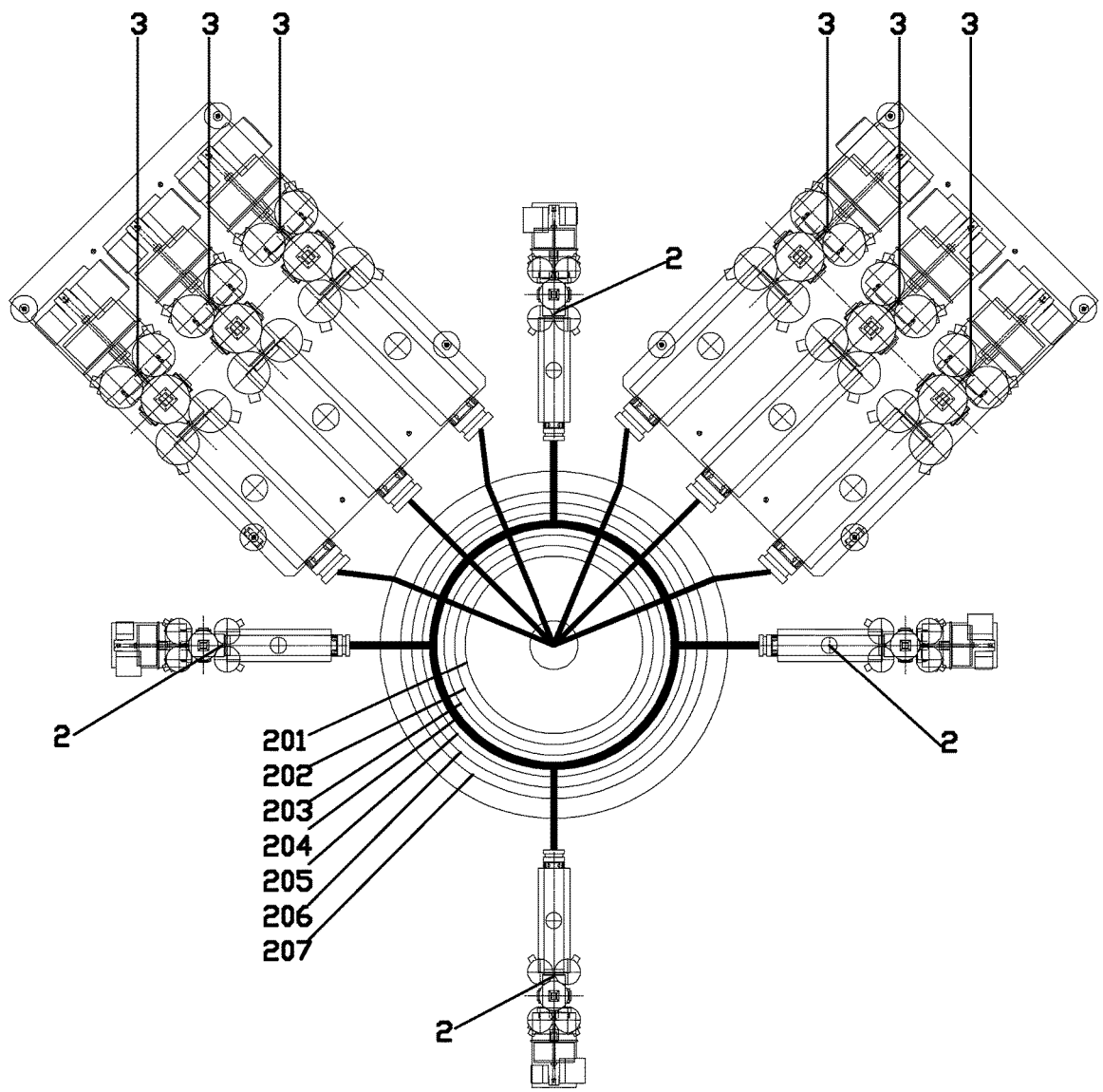
FIG. 7 is a plan view, similar to that of FIG. 5, but showing an arrangement of extruders around a seven-layer extrusion die.

In FIG. 7 another embodiment in accordance with the present invention is shown. In this case, we have the top view of a seven layer die. In this die layers 201,202,203, 205,206,207 are each centre fed by a respective extruder 3. Layer 204 is side fed by four smaller extruders 2.

Figure 8:
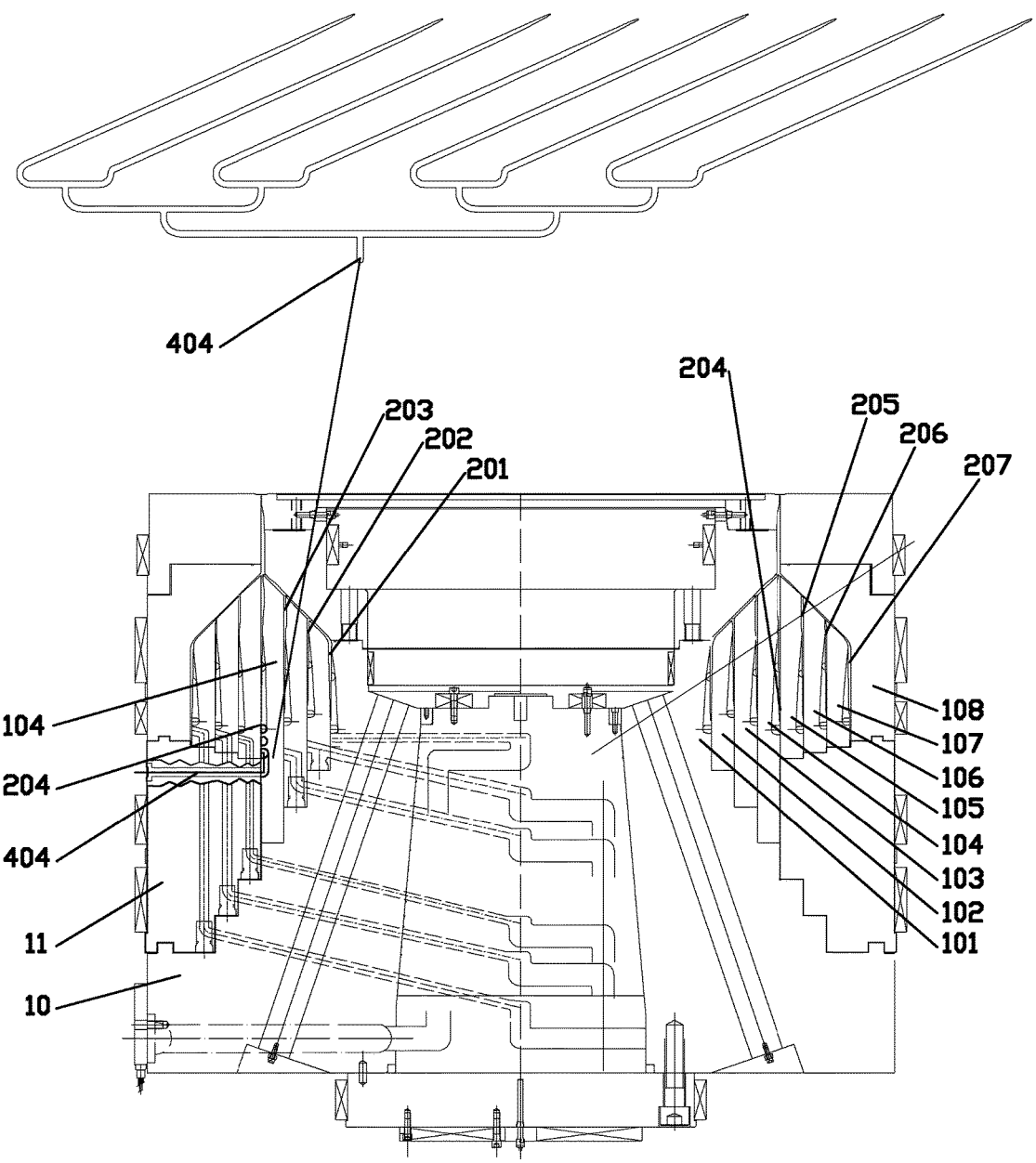
FIG. 8 shows the corresponding longitudinal and developed sections for the co-extrusion die of FIG. 7.

FIG. 8 shows a first embodiment of the longitudinal and developed sections of the 1800 mm die of FIG. 7. Melt feed to the layer 204 is implemented with four inlets 404 in accordance with the present invention, with the inlet channels 404, like the inlet channel 403 of FIG. 4, passing through a central die block 11 directly to the layer 204. The length calculated is 1020 mm as shown with reference to table 3 below. Comparing this to the same layer of the corresponding prior art die design, we can see that for a die design implemented according to prior art the corresponding length is 2968 mm as shown in table 5 below. Therefore, according to the present invention, we have a length reduction of 65.6%.

TABLE 3

Layer length calculations for a 7 layer co-extrusion die of the examples

| Layer | Diameter | Total length |
|---|---|---|
| D(middle) | 1800 | 1020 |
| G (outer) | 2280 | 922 |

Figure 9:
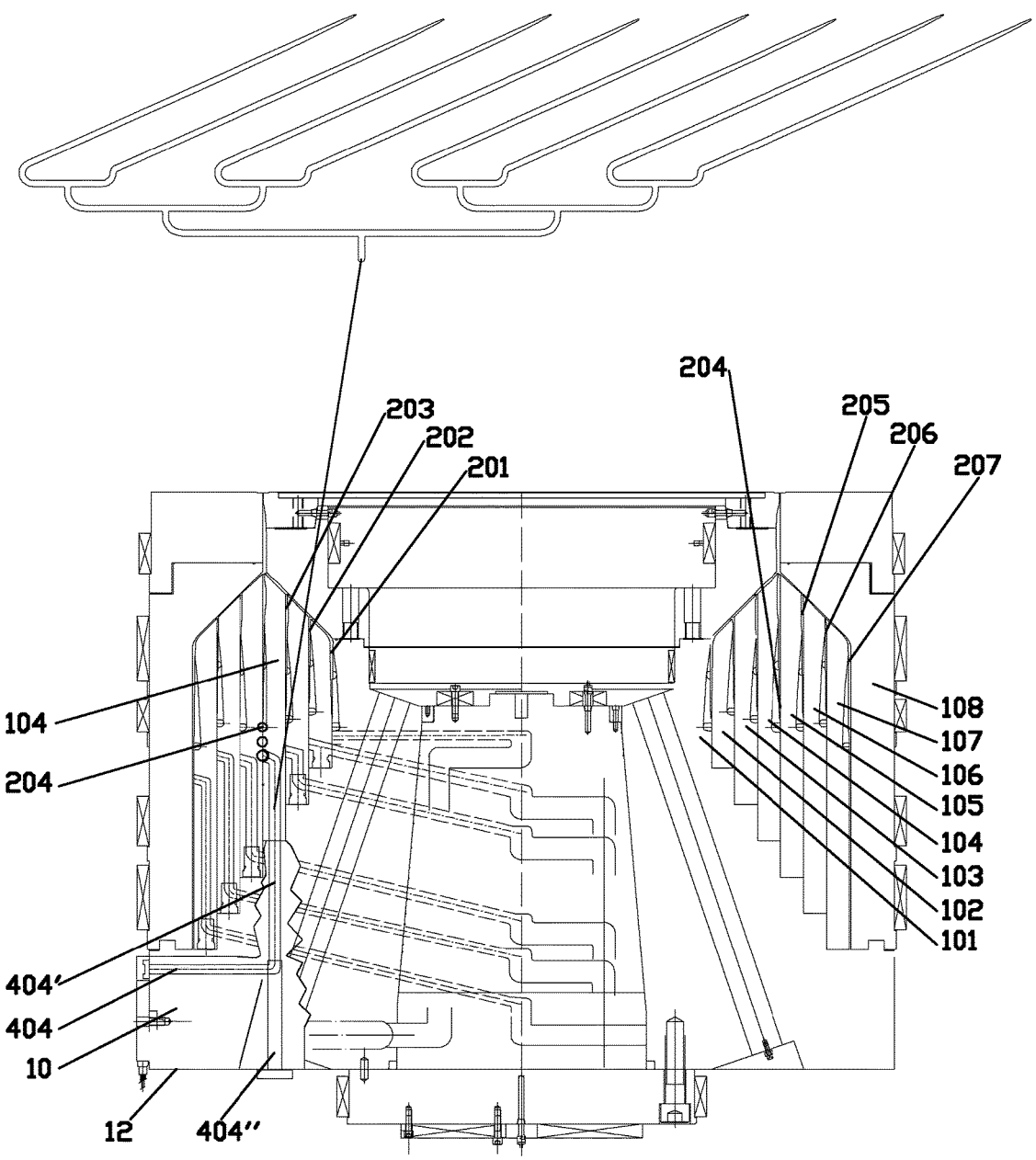
FIG. 9 shows another embodiment of the corresponding longitudinal and developed sections for the co-extrusion die of FIG. 7.

FIG. 9 shows another embodiment of the longitudinal and developed sections of the 1800 mm die of FIG. 7. Melt feed to the layer 204 is implemented with four inlets 404 in accordance with the present invention entering the die directly through the main body 10 of the die and then turning to be parallel with the die axis 20 before entering the mandrel. To allow machining of the parallel portion 404' it is drilled from the lower surface 12 of the main die body 10 and the lower part 404" is then closed by a plug. The length calculated is 1320 mm as shown with reference to table 4 below. Comparing this to the same layer of the corresponding prior art die design, we can see that for a die design implemented according to prior art the corresponding length is 2968 mm as shown in table 5 below. Therefore, according to the present invention, we have a length reduction of 55.5%. In a further embodiment (not shown) the radial part of the channel inlet 404 may extend though a pipe to the bottom of the channel portion 404" rather than through the main die body 10.

TABLE 4

Layer length calculations for a 7 layer co-extrusion die of the examples

| Layer | Diameter | Total length |
|---|---|---|
| D(middle) | 1800 | 1320 |
| G (outer) | 2280 | 922 |

Figure 3:
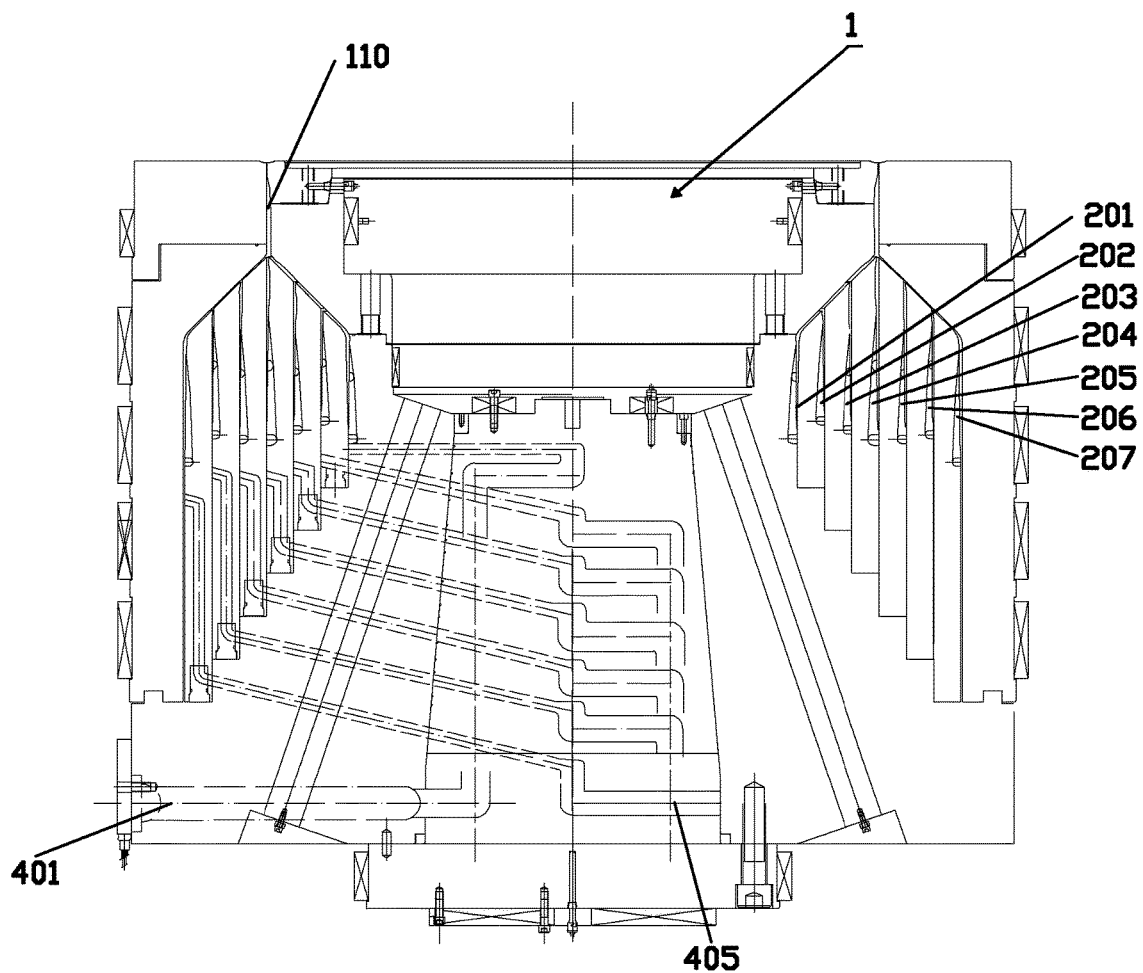
FIG. 3 (Prior Art) is a longitudinal section of a conventional design of a seven-layer concentric annular extrusion die.

For a corresponding seven layer central fed concentric die of prior art design shown in FIG. 3 (of 1800 mm die diameter) the lengths of each of the melt flow paths is indicated in table 5 below.

TABLE 5

Layer length calculation of a prior art 7 layer centrally fed co extrusion die design

| Layer | Diameter | Total length |
|---|---|---|
| A (inner) | 1320 | 2999 |
| B | 1480 | 2902 |
| C | 1640 | 2936 |
| D(middle) | 1800 | 2968 |
| E | 1960 | 3023 |
| F | 2120 | 3119 |
| G (outer) | 2280 | 3087 |

Comparing tables 3 and 4 with table 5, we can conclude that for the outer layer G we also have a significant reduction in length by 2165 mm or 70.1%

The feed to other layers of the die shown in FIGS. 7, 8 and 9 can also be implemented in a similar way if desired.

Figure 2:
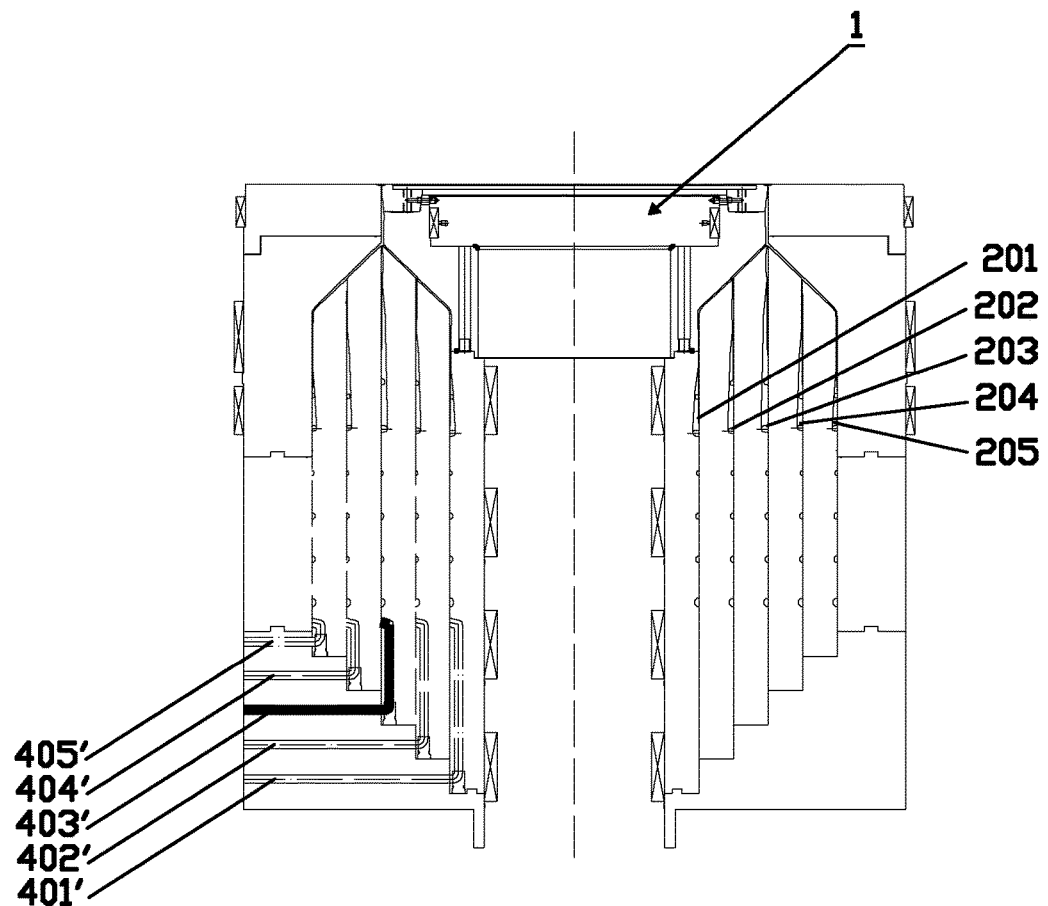
FIG. 2 (Prior Art) is a longitudinal section through a conventional side fed co-extrusion die of relatively small dimensions.

Calculations in respect of a known 450 mm diameter five layer concentric mandrel die (shown in FIG. 2) with side feeding from a single inlet and bifurcated feed channels have also shown the flow path length for the central layer to be 1141 mm. This is compared with the 1800 mm die of FIG. 4 which shows a flow path length of 940 mm, Thus, even a prior art concentric die of much smaller diameter has longer flow paths than a co-extruder die of the invention.

In all embodiments the bifurcated channel can be disposed, over a part or all of its length, in one or more of a vertical, horizontal or conical orientation, depending on die construction and position as illustrated, by way of example, in FIGS. 11A to 11F. Furthermore, a given bifurcated channel BC can be positioned either wholly within the body of one of the die mandrels M, at the surface of a particular mandrel M (see for example FIGS. 11B, 11C and 11F) or partly within each of two adjacent mandrels M of the die which can be oriented vertically, horizontally or conically (see for example FIGS. 11A, 11D and 11E). In addition, combinations of the above positioning of the channel can be implemented for example the bifurcated channel could be positioned partly within the body of one of the die mandrels over a part of its length and partly within each of two adjacent mandrels over a different part of its length. Any such combination is possible depending on requirements. Also, the bifurcated channel may be of different cross-sectional shapes, as shown in FIGS. 11A to 11F. The cross-sectional shape of the feed channels can be circular, oval or any other shape which can be machined and may vary over its length.

Figure 10:
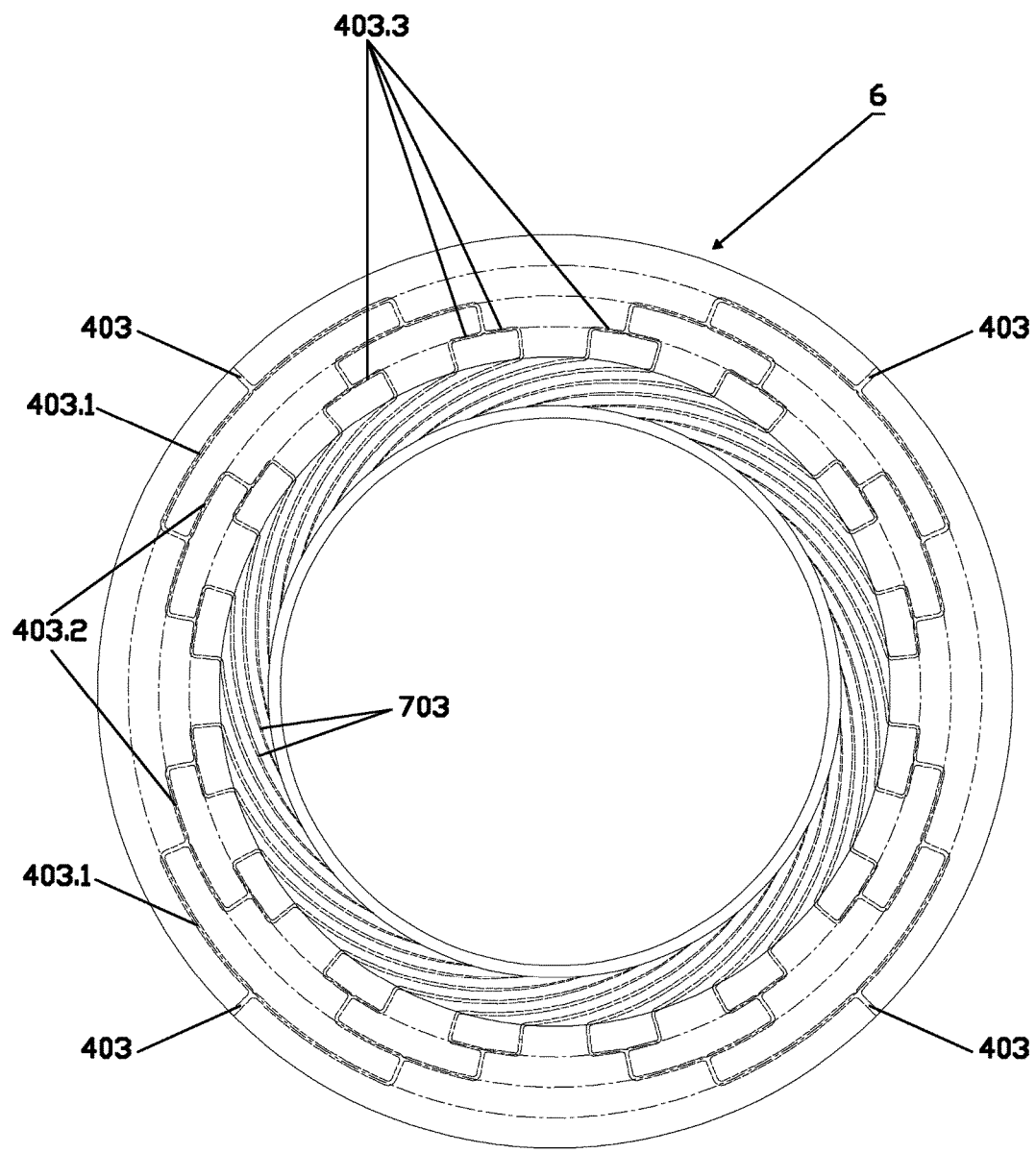
FIG. 10 shows a top view of a modular plate section providing the outer layer of a concentric die.
Figure 11A:
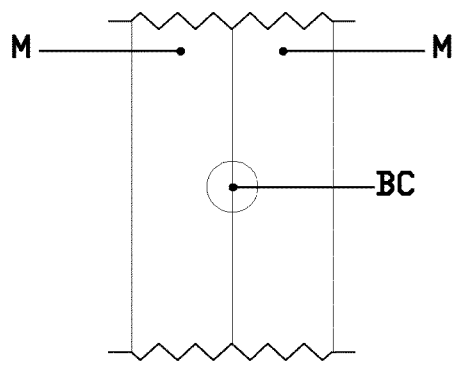
FIGS. 11A-11F are partial cross-sectional views of parts of respective concentric dies to illustrate the form and position of the channels relative to die components.
Figure 11B:
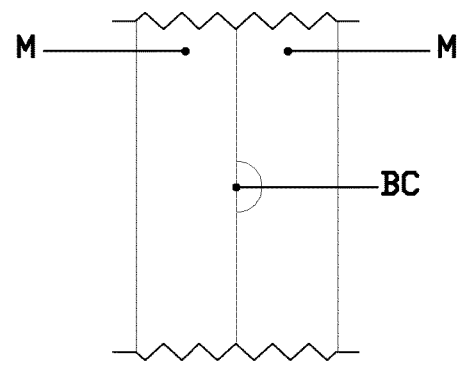
Figure 11C:
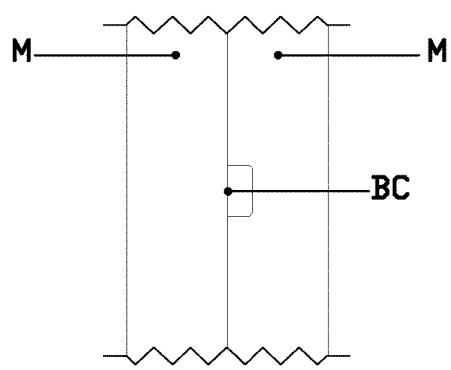
Figure 11D:
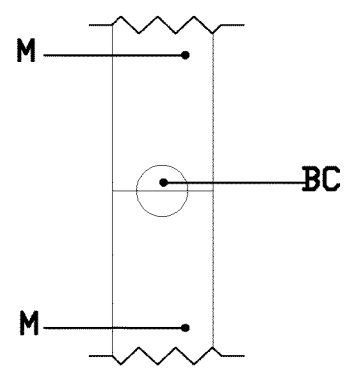
Figure 11E:
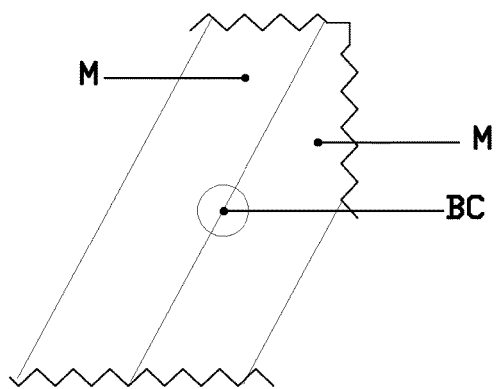
Figure 11F:
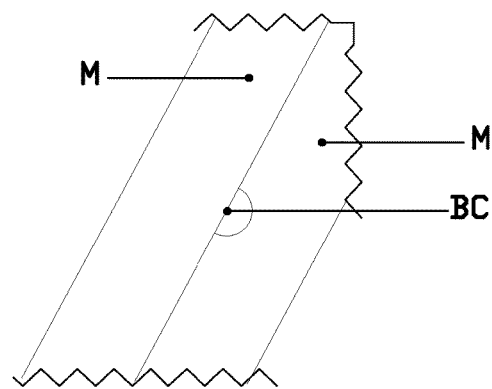

It is possible to have one or more modular plate die sections in the outer layer(s) of a concentric die in accordance with the invention. In FIG. 10 such a design is shown, with a modular plate 6 of 1800 mm. In this embodiment, four inlets 403 are provided which are bifurcated in a similar manner to the examples above and in this case the flow path length to the end of the 32 helical outlet channels 703 is 1056 mm. So again, a reduction in flow path length is possible and similar to that achieved in the previous examples.

It is to be noted that all lengths mentioned in the above examples and tables are indicative and they can vary according to the detail design. However in all cases the lengths of a die implemented according to the present invention are much shorter compared to a prior art die of comparable size and number of layers.

Figure 12:
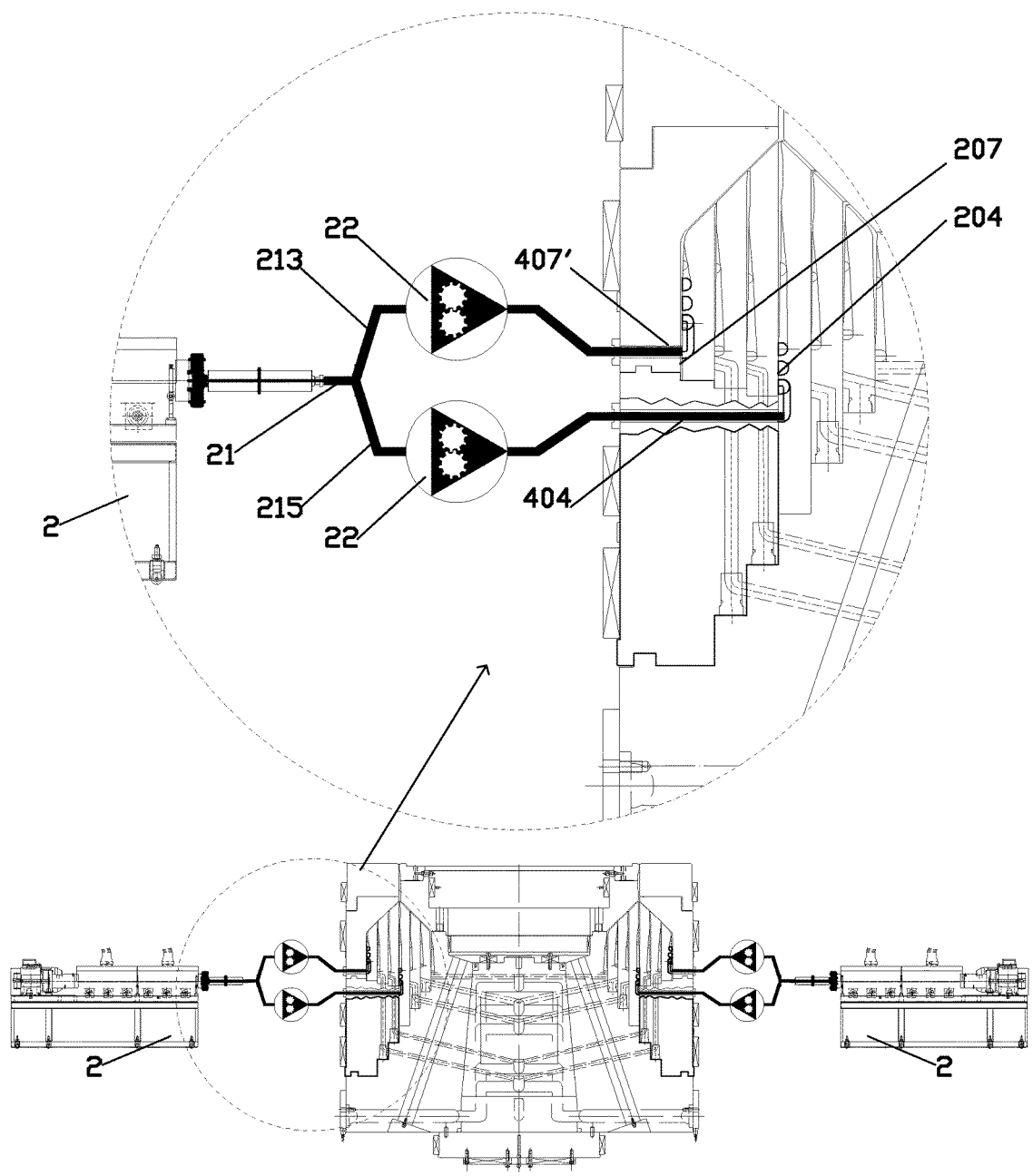
FIGS. 12 and 13 illustrate a multi-layer concentric die in longitudinal section and plan view respectively, with two side-fed layers being fed from the same extruders.
Figure 13:
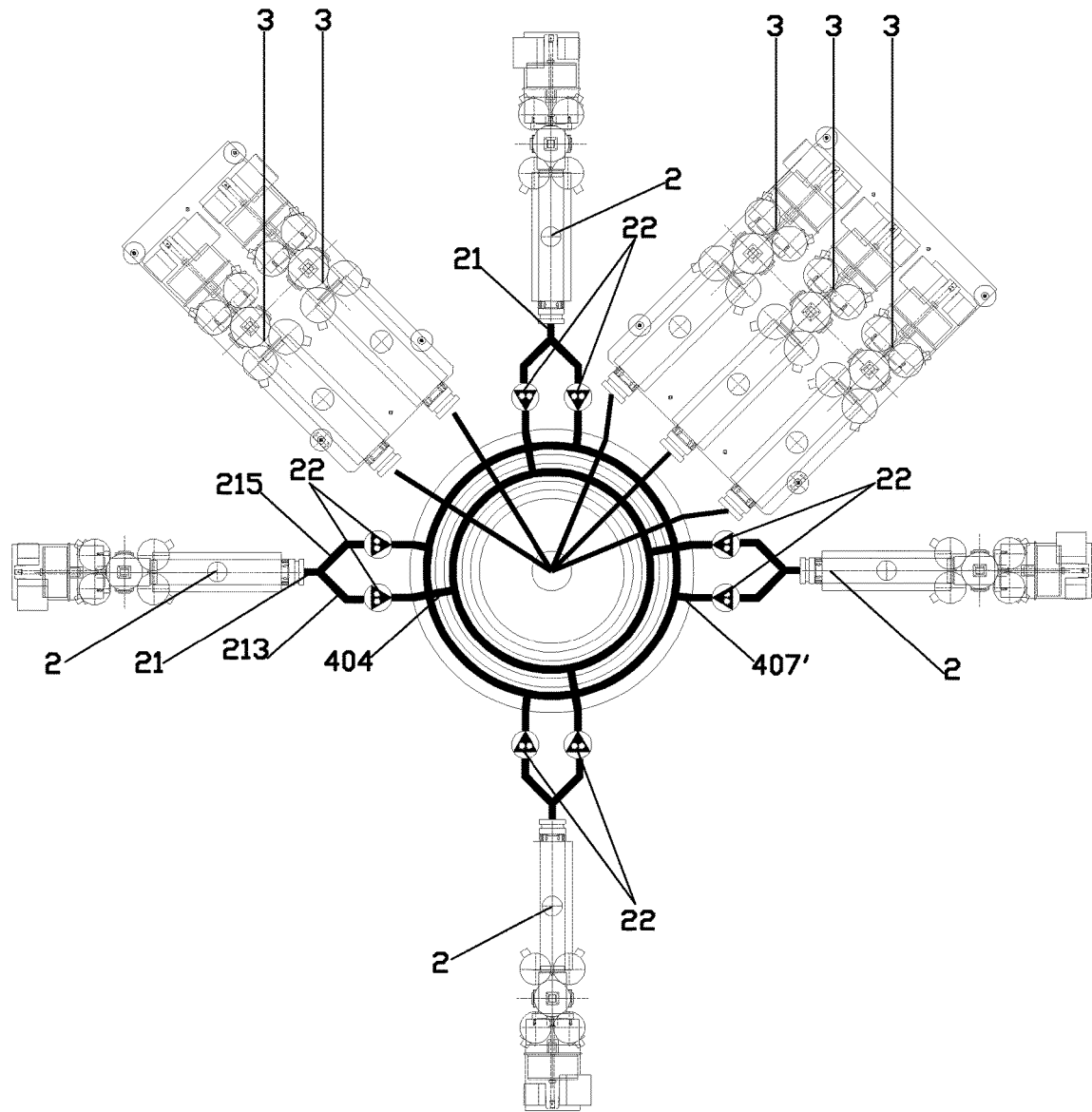

In a further embodiment shown in FIG. 12, one or more of the extruders 2 can be arranged to supply melt to more than one layer. For example this can be achieved by splitting the output channel 21 of an extruder 2 into two output channels 213,215, each of which connects to and supplies a different die layer 207,204. In this case it is possible (but not necessary) to use melt pumps 22 for exact control of the flow to each inlet. FIG. 13 illustrates the arrangement as a top plan view for further understanding.

Further it is also possible that one single inlet, e.g. 405' can be arranged to supply more than one layers of the die, e.g. 204 and 205.

Further, it is also possible that the exit of a bifurcated feed channel, e.g. 403.1, 403.2, or 403.3, is arranged to supply the helical channels of more than one layer.

Although the figures of the various examples of the invention show that the bifurcations of the inlet channels extend mainly in planes normal to the axis 20 of the dies, it is possible for the bifurcation branches to extend at least partially in the axial direction of the die, i.e. so that they are either substantially parallel with the axis 20 or else angled to it.

Table 6 below illustrates a comparison of pressures and residence times between a prior art die and one of similar size but in which the middle layer is implemented according to the present invention. Specifically, the pressures and residence times have been calculated for the middle layer of a prior art 7 layer concentric centrally fed co-extrusion die design of 1800 mm diameter. These pressures and residence times have been calculated for three different materials Linear Low density polyethylene (LLDPE), Polyamide (PA) and Ethylene vinyl Alcohol (EVOH). In addition, two levels of shear rate have been considered, 10-13 s$^{-1}$ and 15 s$^{-1}$. The same calculation has been repeated for a 7 layer die of 1800 mm diameter in which the middle layer has been implemented to be side fed from four inlets according to the embodiments presented in the FIGS. 8 and 9. As the table indicates, an improvement from 50 to 60% in the side fed layer can be achieved for both pressure and residence time in comparison to a prior art centrally fed die.

TABLE 6

COMPARISON EXAMPLE INDICATING THE PRESSURE
DROP AND RESIDENCE TIME IMPROVEMENT

DIE DIMENSIONS AND LAYER PERCENTAGES USED IN THE EXAMPLE

Die gap diameter (mm): 1800
Number of layers: 7
Output (Kg/h): 1800
Film total thickness (μm): 180
Die layers location: inner     middle     outer
Die layers number: 1   2   3   4   5   6   7
Die layers code: A   B   C   D   E   F   G
Layer percentage - example: 18.33%   15.00%   15.00%   3.33%   15.00%   15.00%   18.33%
Middle layer output (Kg/h): 60
Middle layer thickness (μm): 6

| Data for middle layer | | Middle layer centrally fed (prior art) | | | | Middle layer side fed with 4 inlets | | | | Comparison results (% in respect to prior art) | |
|---|---|---|---|---|---|---|---|---|---|---|---|
| | | Total | | | | Total | | | | | |
| Material | Melt temp (° C.) | Total length (mm) | pressure drop (bar) | Residence time (sec) | Shear Rate (1/s) | Total length (mm) | pressure drop (bar) | Residence time (sec) | Shear Rate (1/s) | Pressure drop (%) | Residence time (%) |
| Below is a simulation (based on the Carreau model) of the embodiment shown in FIG. 8 | | | | | | | | | | | |
| LLDPE | 220 | 2968 | 283 | 124 | 13 | 1020 | 112 | 49 | 13 | 60.4 | 60.5 |
| | | 2968 | 327 | 113 | 15 | 1020 | 130 | 45 | 15 | 60.2 | 60.2 |
| PA | 230 | 2968 | 138 | 150 | 10 | 1020 | 55 | 60 | 10 | 60.1 | 60.0 |
| | | 2968 | 227 | 115 | 15 | 1020 | 90 | 46 | 15 | 60.4 | 60.0 |
| EVOH | 210 | 2968 | 290 | 156 | 10 | 1020 | 115 | 62 | 10 | 60.3 | 60.3 |
| | | 2968 | 447 | 120 | 15 | 1020 | 178 | 48 | 15 | 60.2 | 60.0 |
| Below is a simulation (based on the Carreau model) of the embodiment shown in FIG. 9 | | | | | | | | | | | |
| LLDPE | 220 | 2968 | 283 | 124 | 13 | 1320 | 140 | 62 | 13 | 50.5 | 50.0 |
| | | 2968 | 327 | 113 | 15 | 1320 | 162 | 56 | 15 | 50.5 | 50.4 |
| PA | 230 | 2968 | 138 | 150 | 10 | 1320 | 68 | 74 | 10 | 50.7 | 50.7 |
| | | 2968 | 227 | 115 | 15 | 1320 | 112 | 57 | 15 | 50.7 | 50.4 |
| EVOH | 210 | 2968 | 290 | 156 | 10 | 1320 | 143 | 77 | 10 | 50.7 | 50.6 |
| | | 2968 | 447 | 120 | 15 | 1320 | 221 | 59 | 15 | 50.6 | 50.8 |

Carreau is a well known rheological model which is used for simulating the rheological behavior of melt plastics. The 'layer percentage' shown in the first part of the table for each layer is the percentage of material by (presumably) weight.

Further simulations have shown that it is possible to run EVOH in the middle layer of a 1800 mm die configured with four (4) extruders feeding the die from the side as proposed by the present invention, and achieving output down to 33 kg/h with process conditions (shear stresses, shear rate, residence time, etc) according to raw material suppliers recommendations.

The invention claimed is:

1. A concentric co-extrusion die comprising:
   an annular extrusion outlet; and
   a plurality of concentric annular or conical extrusion layers, each layer defined by a pair of adjacent concentric annular or conical die mandrels defining between them a flow path for molten thermoplastics material, from a layer inlet to an annular extrusion layer outlet, through which a thermoplastics tubular extrusion is formed in use, extrusion through each of the plurality of annular layer outlets feeding the annular extrusion outlet, thereby forming a multi-layered product,
   wherein:
   at least one of said extrusion layers has a plurality of molten material inlets arranged spaced apart around the external circumference of the co-extrusion die,
   each molten material inlet being connected to a feed channel which has a plurality of bifurcations providing $2^n$ subsidiary outlet feed channels with n being the number of bifurcations,
   each subsidiary outlet feed channel is connected to a corresponding helical outlet channel so as to provide a continuous flow path along the subsidiary outlet feed channel and the corresponding helical outlet channel,
   each of the plurality of molten material inlets is connected to a respective group of the helical outlet channels, and
   the molten material inlets arranged around the external circumference of the co-extrusion die are connected to the corresponding feed channels via respective inlet paths passing through a central die block separate from the mandrels and from a main body of the die.

2. A concentric co-extrusion die according to claim 1, wherein each said layer has a plurality of molten material inlets arranged around the external circumference of the co-extrusion die.

3. A concentric co-extrusion die according to claim 2, wherein each of said layers having a plurality of molten material inlets has the same number of inlets.

4. A concentric co-extrusion die according to claim 2, wherein one or more of said layers has a different number of inlets from one or more of the others of said layers.

5. A concentric co-extrusion die according to claim 1, wherein the annular die mandrel layers are cylindrical or conical.

6. A concentric co-extrusion die according to claim 2, wherein the number of bifurcations in each of said layers having a plurality of molten material inlets is the same in each said layer.

7. A concentric co-extrusion die according to claim 2 wherein the number of bifurcations in one or more of said layers having a plurality of molten material inlets is different from the number of bifurcations in one or more of the others of said layers.

8. A concentric co-extrusion die according to claim 1, wherein each said layer having a plurality of molten material inlets has bifurcated feed channels disposed over a part or all of their length in one or more of a vertical, horizontal or conical orientation.

9. A concentric co-extrusion die according to claim 8, wherein the orientation of the bifurcated feed channels in all said layers is the same.

10. A concentric co-extrusion die according to claim 1, further including an additional layer comprising a modular plate having a plurality of inlets for the supply of molten polymer, the plate being arranged to provide an outer layer of extruded film.

11. A concentric co-extrusion die according to claim 10, further including a plurality modular plates arranged to provide a plurality of outer layers.

12. A concentric co-extrusion die of claim 1, wherein each of the groups of helical outlet channels is connected to a respective portion of the circumference of an annular layer outlet of the at least one extrusion layer, which portion is less than the full circumference of the annular layer outlet.

13. A concentric co-extrusion die system comprising of:
a co-extrusion die, the die having
an annular extrusion outlet; and
a plurality of annular or conical extrusion layers, each layer defined by a pair of adjacent annular or conical die mandrels defining between them a flow path for molten thermoplastics material, from a layer inlet to an annular extrusion layer outlet, through which a thermoplastics tubular extrusion is formed in use, extrusion through each of the plurality of annular layer outlets feeding the annular extrusion outlet, thereby forming a multi-layered product, wherein:
at least one of said extrusion layers has a plurality of molten material inlets arranged spaced apart around the external circumference of the co-extrusion die,
each molten material inlet being connected to a feed channel which has a plurality of bifurcations providing $2^n$ subsidiary outlet feed channels, with n being the number of bifurcations,
each subsidiary outlet feed channel is connected to a corresponding helical outlet channel so as to provide a continuous flow path along the subsidiary outlet feed channel and the corresponding helical outlet channel,
each of the plurality of molten material inlets is connected to a respective group of the helical outlet channels, and
the molten material inlets arranged around the external circumference of the co-extrusion die are connected to the corresponding feed channels via respective inlet paths passing through a central die block separate from the mandrels and from a main body of the die, and
a plurality of thermoplastic material extruders for supplying the at least one of said layers with molten material.

14. A concentric co-extrusion die system according to claim 13, further comprising at least one extruder supplying one or more inlets of one or more layers of the die.

15. A concentric co-extrusion die system according to claim 14, wherein one or more of said at least one extruder is connected to the inlets of the die via a melt pumps.

16. A concentric co-extrusion die system of claim 13, wherein each of the groups of helical outlet channels is connected to a respective portion of the circumference of an annular layer outlet of the at least one extrusion layer, which portion is less than the full circumference of the annular layer outlet.

* * * * *